United States Patent
Mao (10) Patent No.: US 6,302,242 B1
(45) Date of Patent: Oct. 16, 2001

(54) GUIDE SUPPORTS OF BICYCLE BRAKE SHOES

(76) Inventor: Chen Shou Mao, 344, Section 1, Chung Shan Road, Ta Cha Township, Taichung Hsien (TW)

( * ) Notice: Subject to any disclaimer, the term of this patent is extended or adjusted under 35 U.S.C. 154(b) by 0 days.

(21) Appl. No.: 09/468,431

(22) Filed: Dec. 21, 1999

(51) Int. Cl.[7] .................................................. B62L 3/00
(52) U.S. Cl. ............................................................ 188/24.21
(58) Field of Search ............................ 188/24.21, 24.22, 188/24.12, 2 D (56) References Cited

U.S. PATENT DOCUMENTS

| | | | | |
|---|---|---|---|---|
| 374,002 | * | 11/1887 | Platner .......................... | 188/24.21 |
| 538,930 | * | 5/1895 | Pahlmann ...................... | 188/24.21 |
| 4,391,352 | * | 7/1983 | Brown ........................... | 188/24.12 |
| 4,869,351 | * | 9/1989 | Romano ........................ | 188/24.21 |
| 5,913,388 | * | 6/1999 | Ota et al. ...................... | 188/24.22 |

FOREIGN PATENT DOCUMENTS

| | | | | |
|---|---|---|---|---|
| 0514470 | * | 3/1921 | (FR) | 188/24.21 |
| 0562372 | * | 11/1923 | (FR) | 188/24.21 |
| 604221 | * | 4/1926 | (FR) | 188/28 |
| 405058375-A | * | 3/1993 | (JP) | 188/24.21 |

* cited by examiner

Primary Examiner—Robert J. Oberleitner
Assistant Examiner—Xuan Lan Nguyen
(74) Attorney, Agent, or Firm—Harrison & Egbert (57) ABSTRACT

A bicycle brake system including a locating frame which is fastned with a bicycle front fork for locating a first guide support and a second guide support. The guide supports are respectively provided with a brake shoe. The first guide support and the second guide support are provided with an action arm having a rack which is engaged with the gear. When the second guide support is actuated to swivel by a brake cable fastened therewith, the rack of the action arm of the second guide support actuates the gear to turn. The gear in motion actuates the first guide support to swivel via the rack of the action arm of the first guide support. The brake shoes of the two guide supports are thus actuated synchronously to bring about a braking effect with precision.

1 Claim, 8 Drawing Sheets

GUIDE SUPPORTS OF BICYCLE BRAKE SHOES

FIELD OF THE INVENTION

The present invention relates generally to bicycle brake shoes, and more particularly to guide supports of the bicycle brake shoes.

BACKGROUND OF THE INVENTION

Figure 1:
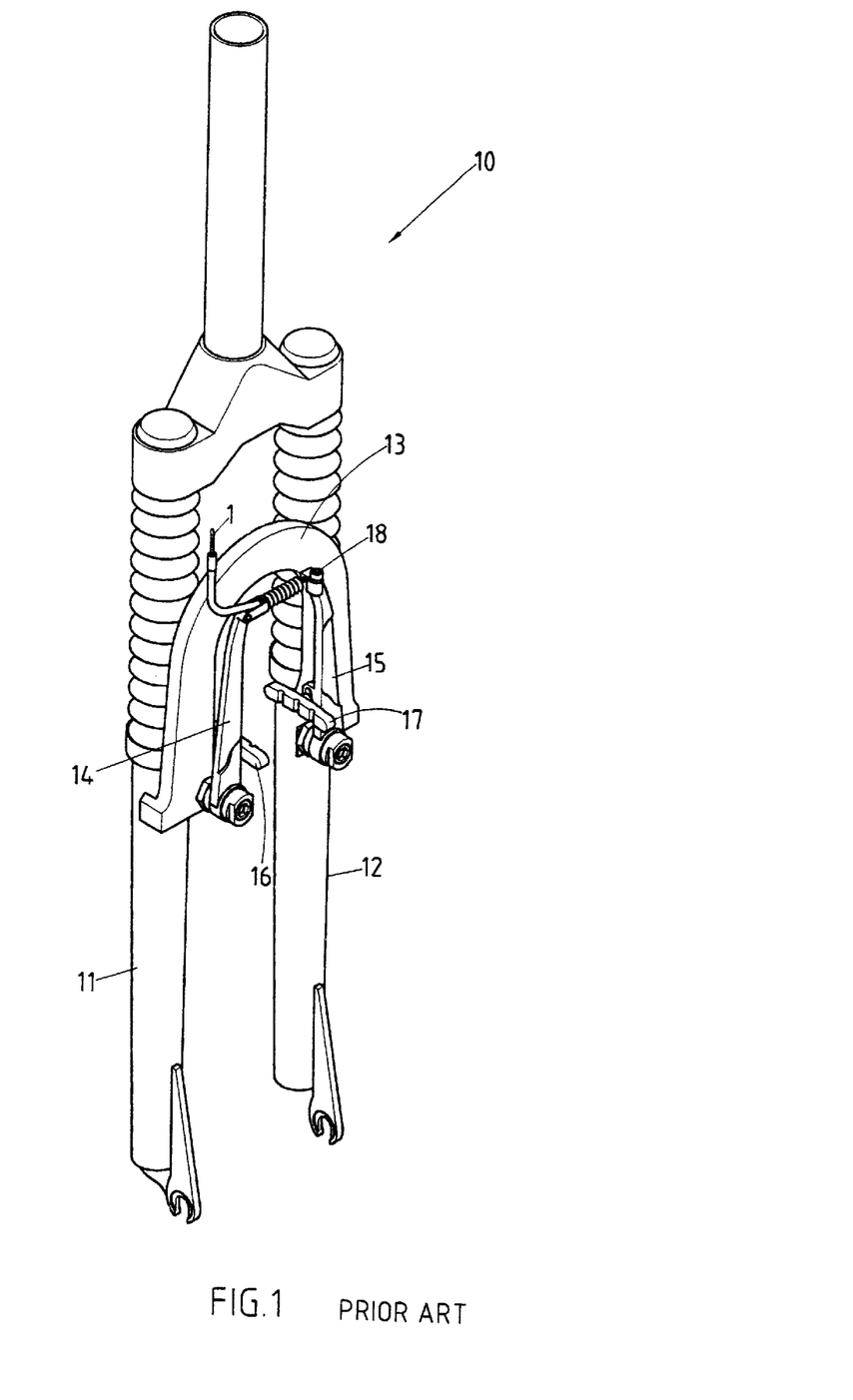
FIG. 1 shows a schematic view of two conventional guide supports for fastening pivotally two bicycle brake shoes.
Figure 2:
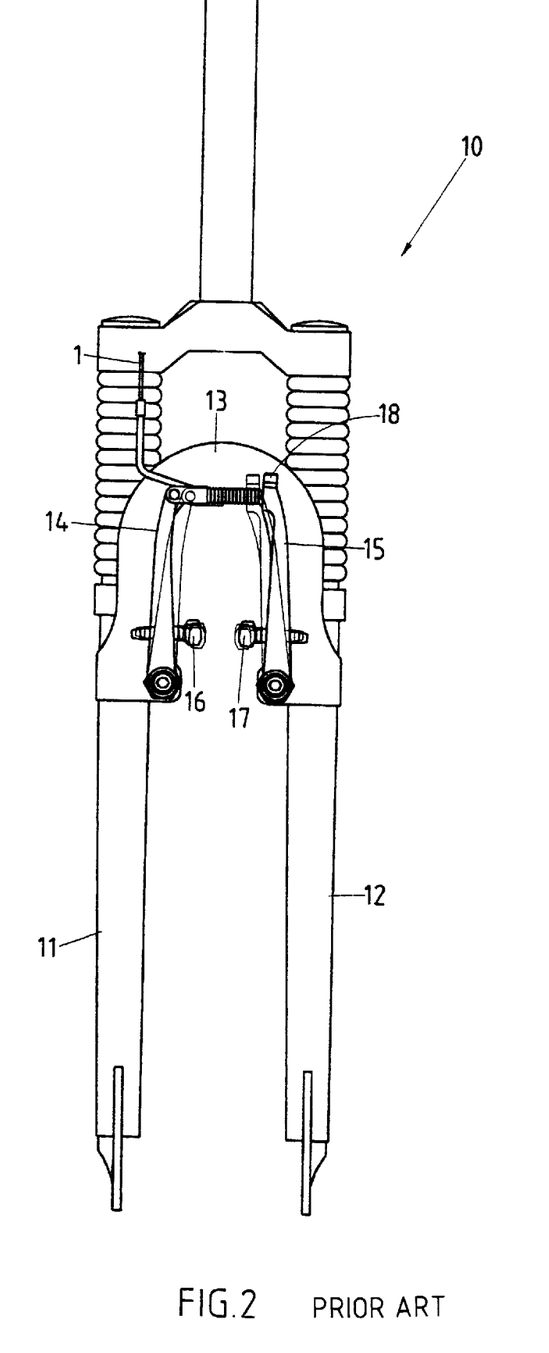
FIG. 2 shows a schematic view of the two conventional guide supports in action to actuate the two bicycle brake shoes to bring about a braking effect.

As shown in FIGS. 1 and 2, a conventional bicycle front fork 10 is provided with an inverted U-shaped locating frame 13 which is fastened with two upright tubes 11 and 12 of the front fork 10. Two guide supports 14 and 15 are fastened pivotally with the locating frame 13 such that the first guide support 14 is used to support a first brake shoe 16, and that the second guide support 15 is used to support a second brake shoe 17. The brake shoes 16 and 17 are respectively actuated by the guide supports 14 and 15, which are linked with a brake cable 1. The brake cable I is put through the top of the first guide support 14 such that one end of the brake cable 1 is fastened with the top of the second guide support 15 by a fastening screw 18. When the brake cable 1 is pulled to slow down or stop the bicycle in motion, the brake shoes 16 and 17 are not evenly exerted on by the pull force of the brake cable 1 because the two guide supports 14 and 15 are different in amplitude when they swivel. As a result, the braking effect of the two brake shoes 16 and 17 is seriously undermined. In addition, the two brake shoes 16 and 17 are different in the extent to which they are worn.

SUMMARY OF THE INVENTION

The primary objective of the present invention is to provide a bicycle with a braking system comprising a brake cable, two guide supports, and two brake shoes fastened pivotally with the two guide supports capable of being actuated synchronously by the brake cable such that the two brake shoes are actuated uniformly by the two guide supports to bring about a braking action with precision.

The features, functions, and advantages of the present invention will be more readily understood upon a thoughtful deliberation of the following detailed description of the present invention with reference to the accompanying drawings.

DETAILED DESCRIPTION OF THE PREFERRED EMBODIMENT

Figure 3:
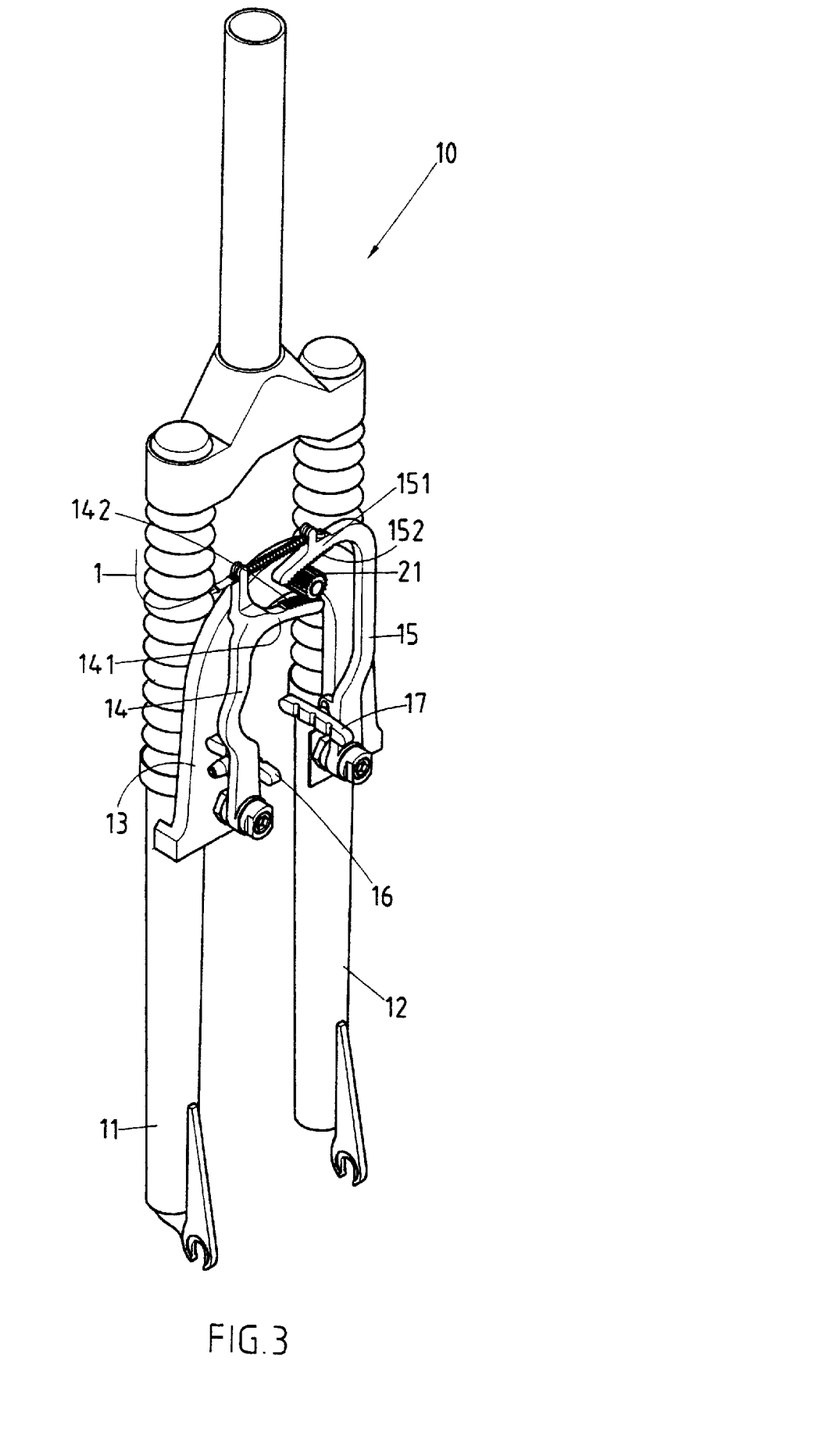
FIG. 3 shows a perspective view of the present invention in conjunction with a bicycle front fork.
Figure 4:
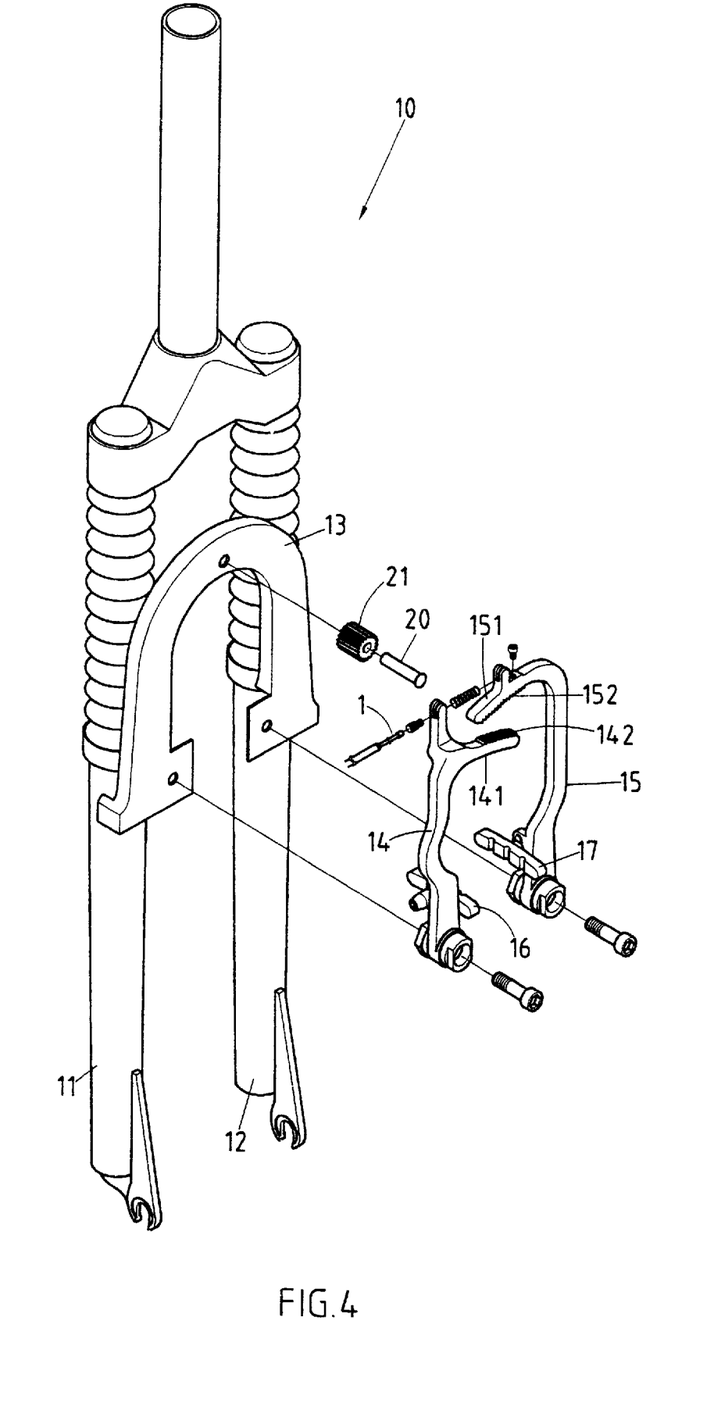
FIG. 4 shows an exploded view of a first preferred embodiment of the present invention.

As shown in FIGS. 3 and 4, a bicycle front fork 10 has two upright tubes 11 and 12, and an inverted U-shaped locating frame 13 which is fastened to the two upright tubes 11 and 12. The present invention comprises a first guide support 14 for pivotally fastening a first brake shoe 16, and a second guide support 15 for pivotally fastening a second brake shoe 17. The first guide support 14 and the second guide support 15 are linked by a brake cable 1. When the brake cable 1 is activated, the two guide supports 14 and 15 are synchronously actuated such that the two brake shoes 16 and 17 work together to bring about a braking effect with precision.

The present invention is characterized by the locating frame 13 which is provided at the center with a gear 21 pivoted thereto by a pivot 20, and is further characterized by the two guide supports 14 and 15, which are respectively provided at the top end with an action arm 141, 151. The first action arm 141 has an upper surface thereof with a first rack 142 which is engaged with the gear 21. The second action arm 151 has an underside thereof with a second rack 152 which is engaged with the gear 21. It must be noted here that the first action arm 141 and the second action arm 151 are respectively and integrally made with the first guide support 14 and the second guide support 15.

Figure 5:
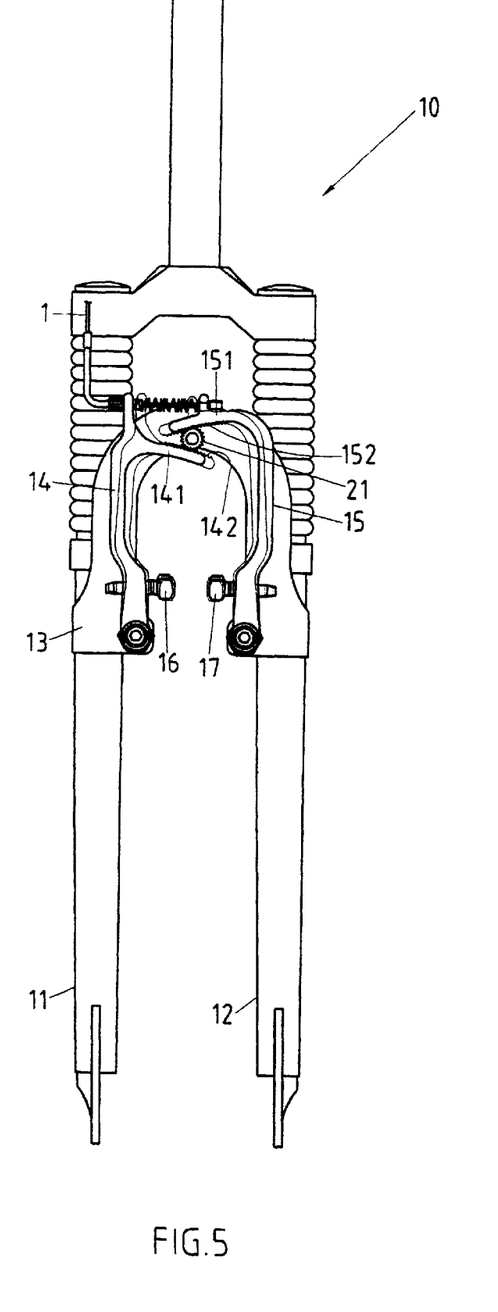
FIG. 5 shows a schematic plan view of the first preferred embodiment of the present invention at work.

As illustrated in FIGS. 3 and 5, when cable 1 is pulled, the second guide support 15 is actuated to swivel in view of the second guide support 15 being fixed with the brake cable 1. However, the gear 21 is actuated to turn by the second arm 151 at the time when the second guide support 15 is actuated to swivel by the brake cable 1. The gear 21 in motion causes the first action arm 141 of the first guide support 14 to turn. As a result, the two brake shoes 16 and 17 are actuated at the same time to press against the front wheel rim of the bicycle in motion.

Figure 6:
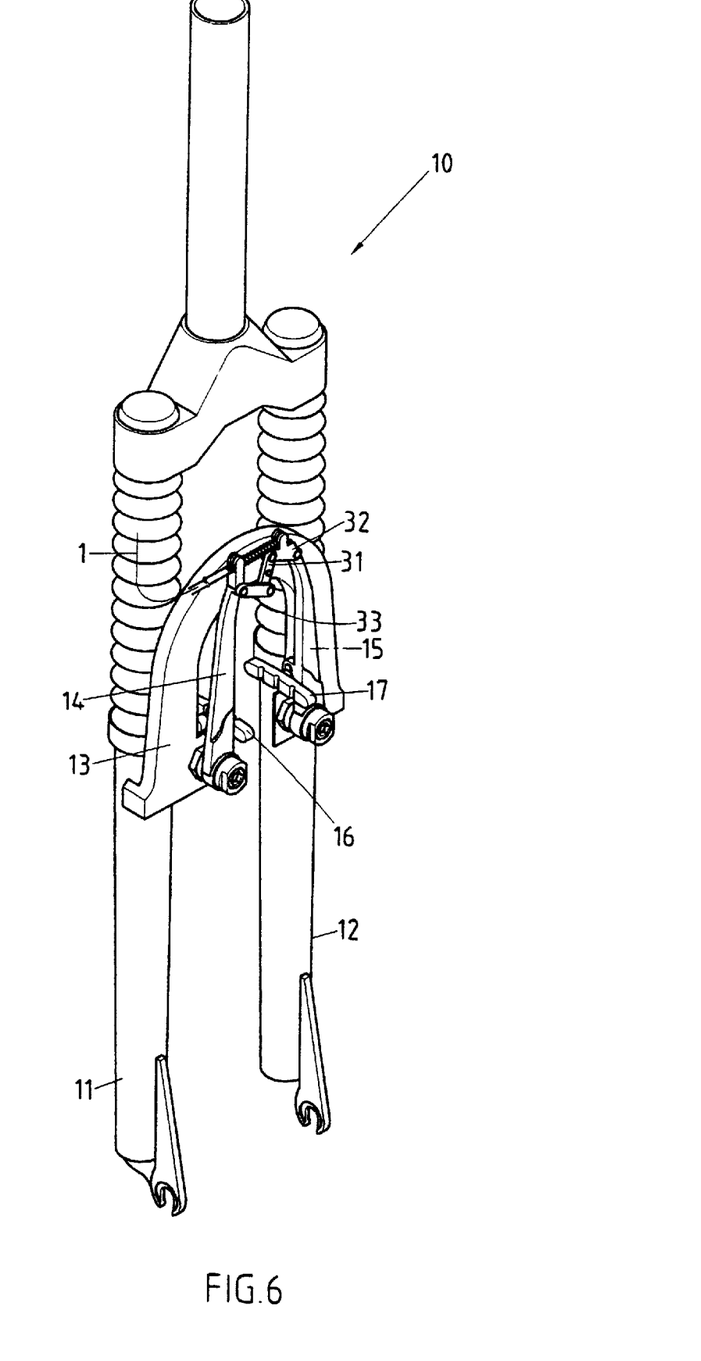
FIG. 6 shows a perspective view of a second preferred embodiment of the present invention.
Figure 7:
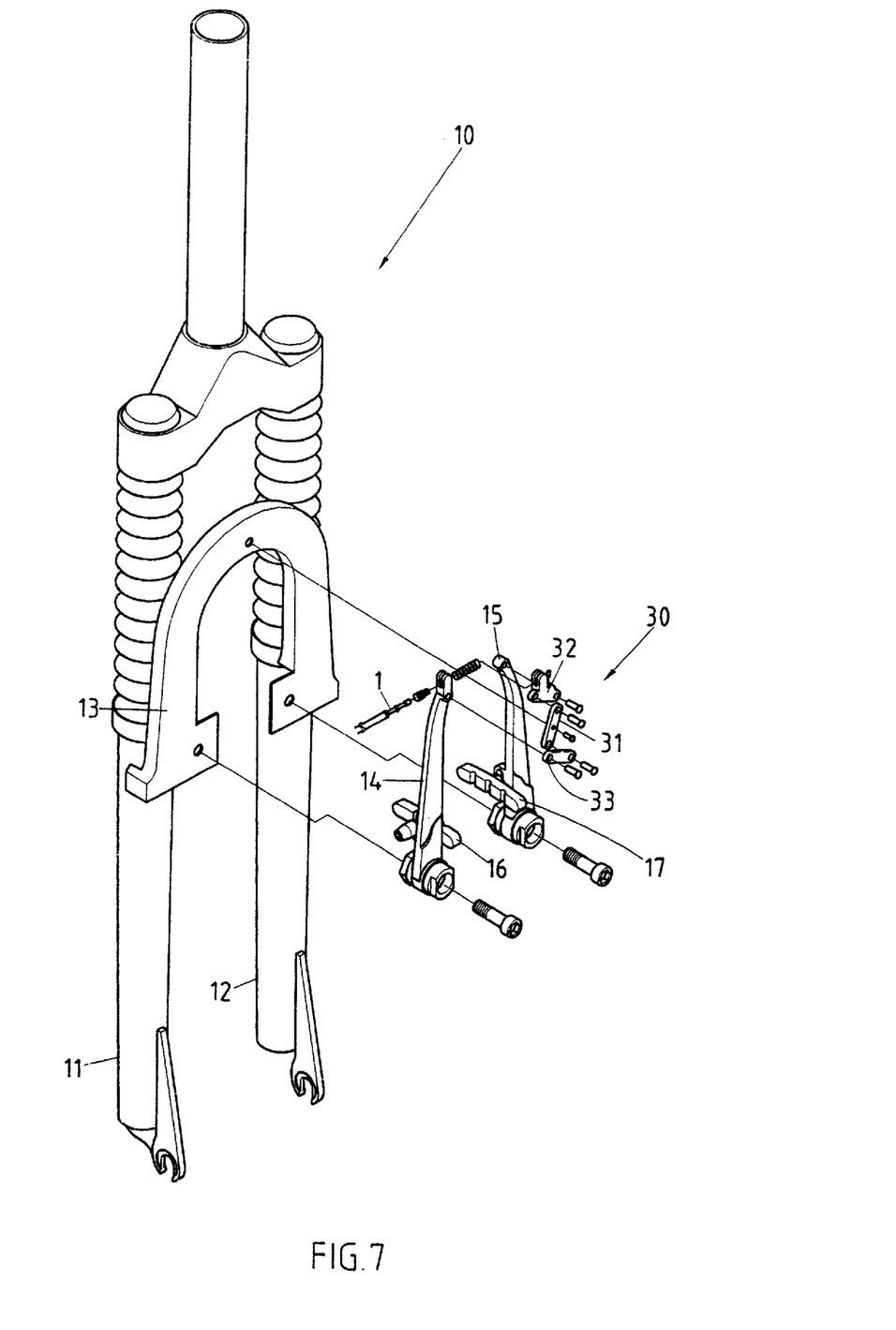
FIG. 7 shows an exploded view of the second preferred embodiment of the present invention.
Figure 8:
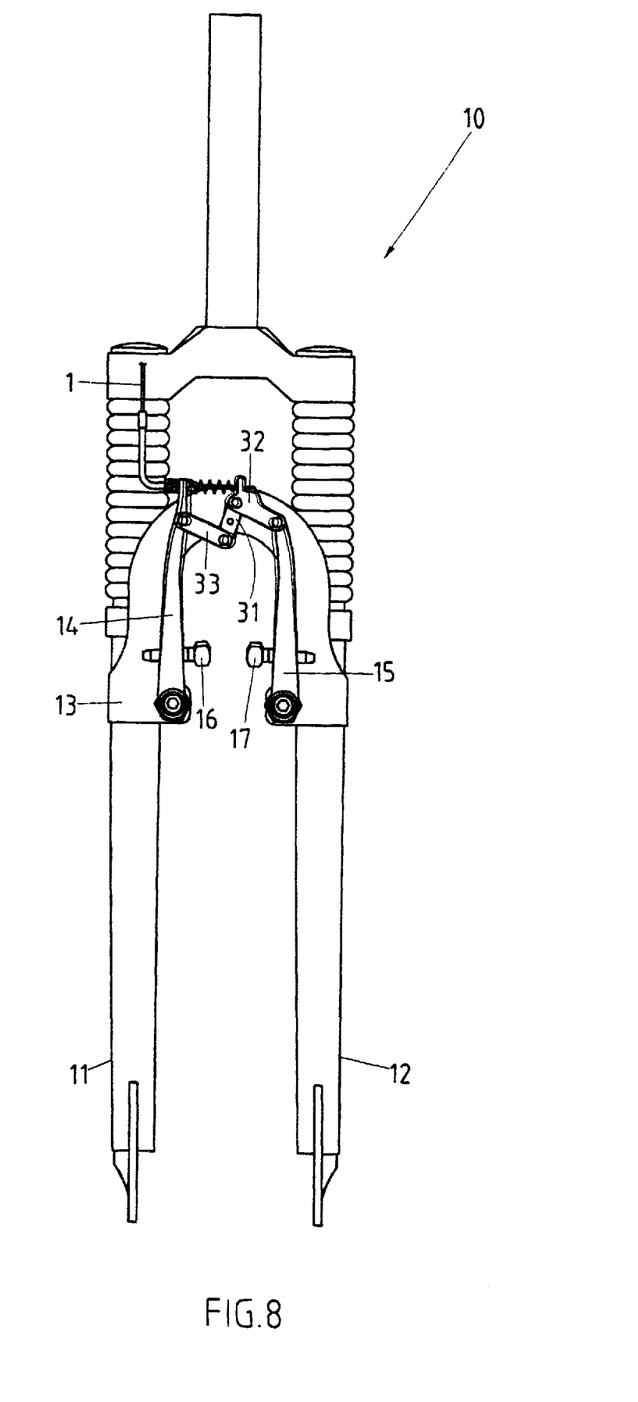
FIG. 8 shows a schematic plan view of the second preferred embodiment of the present invention at work.

As shown in FIGS. 6, 7, and 8, the second preferred embodiment of the present invention comprises a first guide support 14 and a second guide support 15, which share an action member 30 such that the brake cable 1 is fastened to the action member 30 via the first guide support 14, and that the brake cable 1 is linked to the second guide support 15 via the action member 30. The action member 30 comprises a main connection rod 31, an upper connection rod 32, and a lower connection rod 33. The main connection rod 31 is pivoted to the center of the locating frame 13 by a pivot such that the end of the main connection rod 31 is fastened pivotally with one end of the upper connection rod 32. The upper connection rod 32 is fastened to the brake cable 1. The main connection rod 31 is fastened pivotally at the bottom end thereof to one end of the lower connection rod 33. The lower connection rod 33 is in turn fastened pivotally at the thereof with the first guide support 14. In operation, as the brake cable 1 is pulled, the second guide support 15 is first actuated via the upper connection rod 32 to swivel. At the time when the upper connection rod 32 is pulled by the brake cable 1, the top end of the main connection rod 31 is pushed toward the first guide support 14 to cause the bottom end of the main connection rod 31 to pull the lower connection rod 33 in an opposite direction. As a result, the first guide support 14 is actuated by the lower connection rod 33 to swivel. The two guide supports 14 and 15 are thus actuated to swivel synchronously so as to enable the two brake shoes 16 and 17 to work together to bring about a braking effect with precision. In the meantime, the two brake shoes 16 and 17 are not worn unevenly.

The embodiments of the present invention described above are to be regarded in all respects as being merely illustrative and not restrictive. Accordingly, the present invention may be embodied in other specific forms without deviating from the spirit thereof. The present invention is therefore to be limited only by the scope of the following appended claims.

I claim:
1. A bicycle brake system comprising:

a locating frame fastened with a bicycle front fork;

a first guide support fastened pivotally with said locating frame and provided with a first brake shoe fastened therewith;

a second guide support fastened pivotally with said locating frame and provided with a second brake shoe fastened therewith; and a brake cable connected at one end thereof with said second guide support;

wherein said locating frame is provided with a gear pivoted thereto;

wherein said first guide support is provided at one end thereof with an action arm extending therefrom and having in an upper surface thereof a rack whereby said rack is engaged with said gear of said locating frame;

wherein said second guide support is provided at one end thereof with an action arm extending therefrom and having in an underside thereof a rack whereby said rack is engaged with said gear of said locating frame;

said second guide support being actuated to swivel by said brake cable at such time when said brake cable is pulled by an external force, thereby causing said rack of said action arm of said second guide support to actuate said gear of said locating frame to turn whereby said gear in motion actuates said first guide support to swivel via said rack of said action arm of said first guide support.

* * * * *